United States Patent Office 3,467,117
Patented Sept. 16, 1969

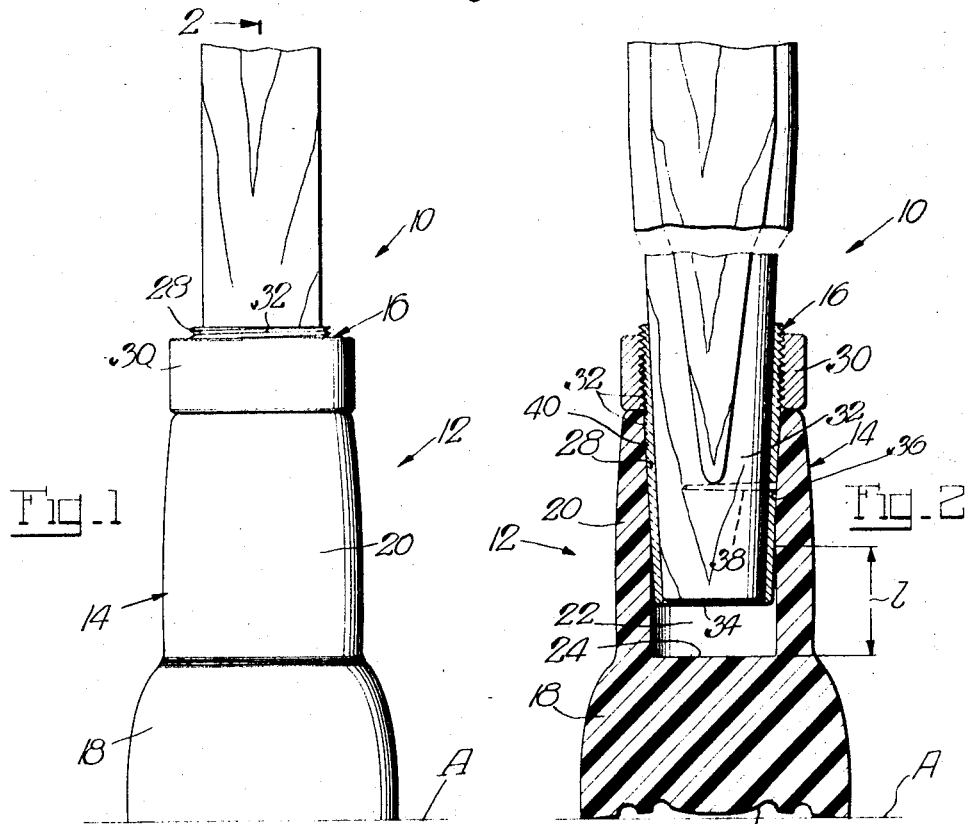
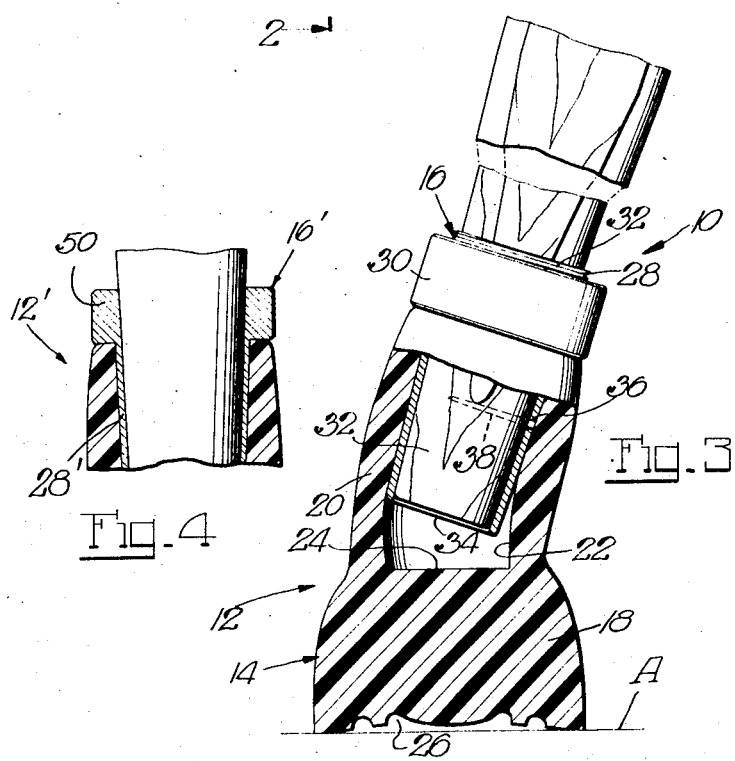

3,467,117
CRUTCH TIP
Louis V. Lucibello, 1821 Ridge Road,
North Haven, Conn. 06473
Filed Aug. 23, 1967, Ser. No. 662,722
Int. Cl. A45b 9/04
U.S. Cl. 135—54                           1 Claim

ABSTRACT OF THE DISCLOSURE

The disclosure deals with a crutch tip having the usual molded rubber part, and in addition a preferred sleeve and nut of which the sleeve is received in the central recess in the rubber part and, in turn, receives the end of a crutch with a firm fit, and the nut is threaded on the sleeve and rests on top of the rubber part in adjusted position to keep the sleeve and crutch end therein spaced from the bottom of the recess in the rubber part.

---

Crutch tips of the kind with which the present invention is concerned are molded of fairly resilient rubber or the like material, and they have a recess for reception of the crutches, with the solid tip material below the recess serving as a cushioned support of the crutch load on the floor or ground. While these tips are satisfactory in general, they are rather deficient in a few, but important, respects. Thus, owing to the resilient give of these tips, they will on first subjection to the full crutch load be peripherally expanded by the customarily tapered crutch ends therein, so that henceforth virtually the entire crutch load will come to rest on the bottoms only of the recesses in the tips. This will inevitably lead to early wear and tear of the tip, with the crutch breaking through to the very bottom of the tip and requiring replacement of the latter all too soon. Also, even when the tip is new it affords only a slightly cushioned support for the crutch load owing to rather limited compressive give under the load of the solid tip material below the crutch, and this already slight cushioning effect of the tip will deteriorate with progressive wear and tear of the latter. Furthermore, while the bottoms of these tips are mostly formed like suction cups for intended slip-free grip effect on the floor or ground, they frequently fail to have this effect, particularly in a leaning position of a crutch owing to then inadequate resilient flexure of the tip to land with its entire cupped bottom on the floor or ground.

It is the primary aim and object of the present invention to provide a crutch tip which not only has none of the aforementioned deficiencies of prior tips, but which is also of exceedingly simple construction and costs the user incomparably less than prior tips.

It is another object of the present invention to provide a crutch tip which consists of a molded rubber part, preferably the aforementioned and nowadays widely used molded tip, and an adapter through intermediation of which a crutch is mounted in the molded tip sufficiently spaced under all circumstances from the bottom of the recess in the tip to avoid the aforementioned deficiencies of this tip if directly applied to a crutch.

It is a further object of the present invention to provide a crutch tip in the form of the aforementioned molded-tip and adapter parts, of which the adapter part is not only of exceeding structural simplicity and low cost, but its application to a crutch and molded tip is achieved in no time at all and requires no skill.

Another object of the present invention is to arrange the aforementioned adapter part of the crutch tip so that the same may permanently remain on the crutch once it is applied thereto, and a molded tip may be applied to and removed from the adapter part simply by slipping it onto and from the latter. With this arrangement, the adapter part entails a one-time and negligible cost and becomes an integral element of a crutch, and replacement of a worn-out molded tip with a new one may be achieved virtually instantaneously and without any skill whatever.

A further object of the present invention is to provide a crutch tip in the aforementioned form of a molded tip and an adapter, of which the adapter is a simple rigid and preferably tapered sleeve with an outward shoulder at the wider end, with the sleeve receiving the correspondingly tapered end of a crutch for its firm support therein, preferably permanently by pinning them together, and the sleeve itself being received in the recess in the molded tip to a partial depth thereof at which the shoulder rests on top of the tip and the taper of the sleeve peripherally expands a top length of the recess in the tip for a sufficiently tight fit between them to obviate their separation in use of the crutch while permitting stripping of the tip from the sleeve with reasonable force for its replacement with a new tip. With this arrangement, the bottom of the crutch will never reach the bottom of the recess in the molded tip, and the crutch load will be transmitted to the tip considerably above its recess bottom, with the result that a predominant part of the tip material may freely respond to the crutch load in resilient compression and flexure with important advantages. Thus, the molded tip has an incomparably longer useful life than a directly applied tip on a crutch and for that reason is a negligible cost item for the user, and its cushioning effect and also slip-free grip on the floor or ground not only prevail for the longest time but are also far superior to those of a directly applied tip on a crutch owing to the vastly increased elastic give of the tip under the crutch load.

It is another object of the present invention to provide a crutch tip of which the aforementioned shouldered-sleeve adapter is preferably formed in two parts, namely a non-shouldered sleeve and a nut threadedly received thereby and serving as the shoulder thereon, with the thread on the sleeve being preferably cut as though on a cylindrical periphery and at the wide end of the tapered, or at least largely tapered, sleeve toward the narrow end thereof preferably to its natural run-out on the sleeve. This arrangement not only affords some adjustability of the extension of the sleeve into the recess in a molded tip and, hence, some control over the operating resiliency of the tip according to the user's preference, but also facilitates removal of a worn-out molded tip from the sleeve by turning the nut in a direction to strip the tip from the sleeve with wedge-like urgency at least over the region of its tightest fit with the latter.

Further objects and advantages will appear to those skilled in the art from the following, considered in conjunction with the accompanying drawings.

In the accompanying drawings, in which certain modes of carrying out the present invention are shown for illustrative purposes:

FIG. 1 is a fragmentary front view of a crutch with a tip that embodies the present invention;

FIG. 2 is a section taken substantially on the line 2—2 of FIG. 1;

FIG. 3 is a section similar to FIG. 2, but showing the crutch in a leaning position; and FIG. 4 is a fragmentary section through a crutch with a tip that embodies the invention in a modified manner.

Referring to the drawings, and more particularly to FIGS. 1 and 2 thereof, the reference numeral 10 designates an invalid's support, such as a crutch 10 with a featured tip unit 12. The unit 12 comprises a resilient tip 14 and an adapter 16.

The tip 14, which may be, and preferably is, a conventional tip in common use nowadays, is a molded part of resilient rubber or rubber-like material. The tip 14 has a base formation 18 and a continuing upright stem formation 20, of which the base formation 18 is solid and the stem formation 20 has a central recess 22 which is usually cylindrical and has a bottom 24 near the base formation 18. The base formation 18 is in this instance of accustomed plug-like shape and has its bottom shaped like a suction cup 26 for secure grip of the tip on the floor or ground A.

The adapter 16 is provided in two parts 28 and 30, of which part 28 is a rigid, preferably metal, sleeve and part 30 is a nut. The sleeve 28 is internally formed for firmly mounting the crutch therein, and is to this end internally tapered in this instance for receiving the correspondingly tapered lower crutch end 32. The sleeve 28 is received in the recess 22 in the tip 14, and is externally dimensioned to have a force fit in the recess 22 by peripherally expanding the stem formation 20 of the tip. Preferably, the sleeve 28 is also tapered externally and of uniform wall thickness throughout, and its upper end is externally threaded at 32 for the reception of the nut 30 which is to rest on top of the stem formation 20 of the tip to hold the inserted sleeve 28 spaced from the bottom 24 of the recess 22 in the tip. The externally tapered sleeve 28 is dimensioned cross-sectionally for ready introduction with its narrow end 34 into the recess 22 in the tip 14 and for progressive peripheral expansion of an upper length of the stem formation 20 of the tip on progressively forcing the sleeve deeper into the recess 22 until the nut 30 comes to rest on top of the tip (FIG. 2), whereby a length $l$ of the stem formation 20 from the bottom 24 of the recess 22 beyond the sleeve end 34 therein remains peripherally non-expanded and, hence, may respond, together with the solid base formation 18 of the tip, in resilient compression and also flexure under a crutch load (FIGS. 2 and 3). On the other hand, the remaining upper length of the recessed stem formation 20 of the tip is sufficiently expanded by the inserted sleeve 28 to hold the latter with a force fit which cooperates with the nut 30 on top of the tip to hold the sleeve spaced from the bottom 24 of the recess 22 under any crutch load (FIGS. 2 and 3). Further, the force fit of the sleeve 28 in the tip recess 22 is more than adequate securely to retain the tip 14 on the sleeve in use of the crutch, yet this force fit may be overcome with reasonable effort for stripping the tip, when worn out, from the sleeve for its replacement with a new tip. Also, to facilitate stripping of a worn-out tip 14 from the sleeve 28, the latter is preferably permanently secured to the crutch 10 which then forms a convenient handle in the tip stripping task. To this end, the sleeve 28 is provided with a hole 36 through which to drive a pin 38 into the lower crutch end 32, with the head of the pin 38 being received in the hole 36. Replacement of a worn tip 14 with a new tip is even simpler than the removal of a worn tip from the sleeve 28, it being merely necessary to insert the crutch with its attached sleeve 28 into the recess 22 in the new tip until encountering reasonable resistance to its further insertion, whereupon on application of the normal load on the crutch the sleeve will be forced into the recess 22 to the full extent at which the nut 30 comes to rest on top of the tip.

Stripping of a worn-out tip 14 from the sleeve 28 on the crutch is even further facilitated by merely turning the nut 30 in a direction to force the sleeve from the tip at least over a length thereof over which it has its greatest force fit with the tip so that hardly any additional effort is required for complete removal of the tip from the sleeve. To this end, the thread 32 on the sleeve 28 extends over an adequate top length of the latter, and is preferably cut into the outer tapering peripheral surface of the sleeve until running out as at 40. While the thread 32 cut in this fashion becomes gradually shallower to its runout on the sleeve at 40, the thread is of adequate overall depth to remain in secure engagement with the nut 30 when transmitting part of the crutch load to the top of the tip in use of the crutch and when manipulating the nut for stripping a worn-out tip from the sleeve 28.

The present tip unit 12 secures several important advantages. Thus, the crutch load is transmitted to the tip over a relatively short top length of the stem formation 20 thereof and is kept away from the bottom 24 of the recess 22 therein, wherefore the tip has freedom to respond to the crutch load in wide resilient compression and flexure which makes not only for use of the crutch with optimum safety and comfort, but also for an exceptionally long useful life of the tip. Insofar as the useful life of the tip is concerned, one tip actually used with the present adapter in the manner explained herein has already outlived by eight to one a similar tip used without the adapter, with the tip used with the adapter being still in satisfactory use with the end not yet in sight. As regards the safe use of a crutch with the present tip unit, the remarkable resilient give of the tip, in compression and flexure, to the crutch load makes for optimum slip-free use of the crutch in general, and in particular for effective grip action of the bottom suction cup of the tip on the ground or floor under all conditions, including leaning crutch positions like or similar to that shown in FIG. 3. Further, the present tip unit may as its tip part use the type of tip which is already in wide use and commercially available, wherefore the adapter alone will be simple application to many crutches in use to convert the latter into crutches with the featured tip unit and all the advantages of the latter. This is particularly feasible because the adapter is of exceeding structural simplicity and low cost and, moreover, is a one-time acquisition for a crutch since the adapter will more often than not outlive the crutch and equally well fit any number of replacement tips. Also, owing to its one-time acquisition and use with a crutch for the life of the latter, the adapter is advantageously mounted permanently on a crutch by pinning the sleeve part thereof to the crutch. The adapter will thus never be lost and stripping of a worn-out tip therefrom is particularly facilitated by making the crutch available as a convenient handle in the task. Stripping of a worn-out tip from the adapter is even further facilitated on manipulating the nut part of the adapter in the described manner. In any event, replacement of a worn-out tip with a new tip is such a simple task that it may in most cases by undertaken quickly and easily by the user of the crutch or by most anyone else.

Reference is now had to FIG. 4 which shows a modified tip unit 12′ of which the adapter 16′ differs from the described adapter 16 in that the present adapter lacks a threaded nut on the sleeve part 28′ and instead has an outward shoulder 50 on top, with the shoulder being preferably annular and formed integrally with the sleeve part 28′.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

What is claimed is:

1. A crutch tip unit, comprising a tip of resilient material having a solid base formation and a continuing upright stem formation with a central cylindrical recess open at the top of said formation and having a bottom near said base formation; and an adapter providing a rigid sleeve ring-shaped in section and tapered substantially over its length for mounting a crutch end therein, and a nut, of which said sleeve is at its wider end externally threaded for reception of said nut, and is received in said recess with said nut resting on the top of said stem formation to hold said sleeve with its narrow end spaced from said recess bottom, with said sleeve being cross-sectionally dimensioned to be in forced fit with said recessed stem formation adequate for secure retention of said tip on said sleeve in use of the unit and said thread on said sleeve being of a length to extend into said recessed stem formation when said sleeve is in forced fit with the latter.

References Cited

UNITED STATES PATENTS

| 281,245 | 7/1883 | Degenhart | 135—55 X |
| 1,347,320 | 7/1920 | Bruyere | 135—60 |
| 2,470,179 | 5/1949 | McCloskey | 287—52.06 |

FOREIGN PATENTS

| 498,347 | 10/1919 | France. |
| 5,560 | 7/1910 | Great Britain. |
| 199,650 | 6/1923 | Great Britain. |

PETER M. CAUN, Primary Examiner

U.S. Cl. X.R.

135—62, 64